T. F. STRONG & M. T. MOODY. No Printed Specification Available
7295X
Rice Cleaning.
Patented Nov. 17, 1832.
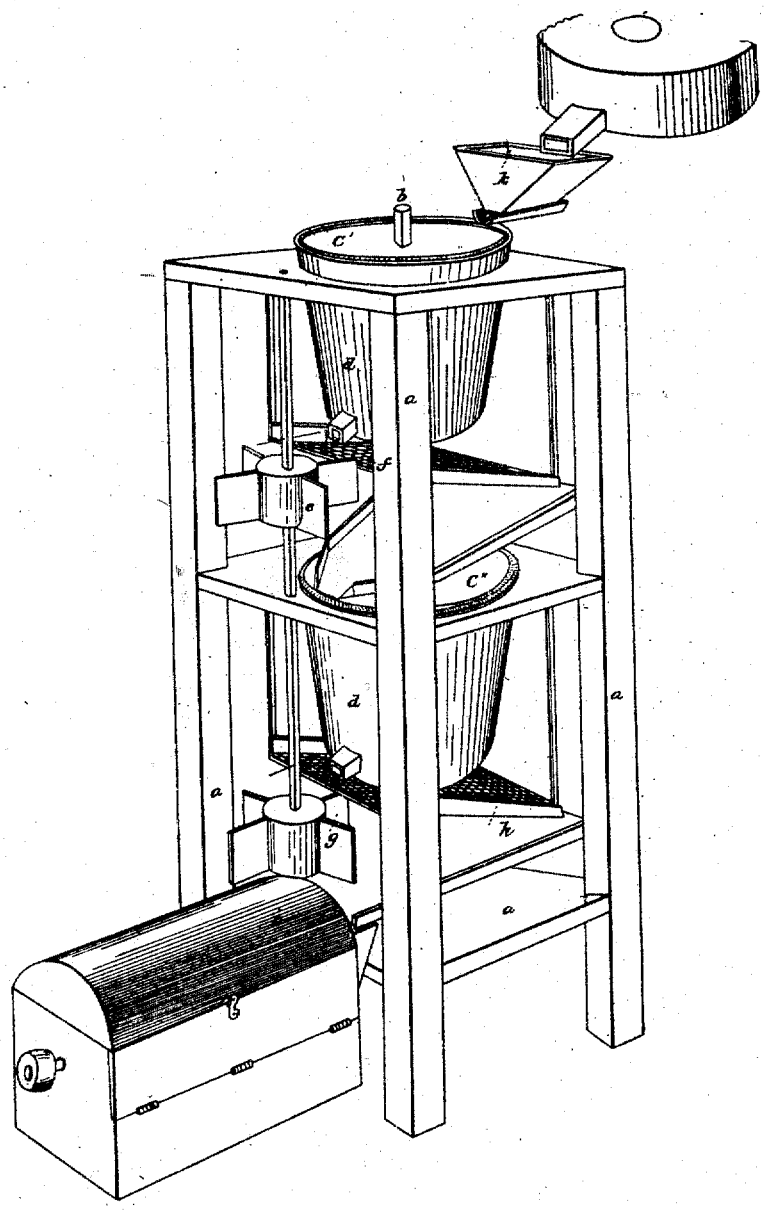

7295X Nov. 17, 1832 75

Theodore F. Strong & Marcus T. Moody
Letters Patent

The Schedule referred to in these Letters Patent and making part of the same containing a description in the words of the said Theodore F. Strong & Marcus T. Moody themselves of their improvement in the Machine for hulling, cleaning & polishing Rice, Barley, Broom Corn & other small seeds.

To all persons to whom these presents shall come, We Theodore F. Strong house joiner & Marcus T. Moody Cabinet Maker both of Northampton in the County of Hampshire & Commonwealth of Massachusetts send greeting. Be it known that we the said Theodore F. Strong and Marcus T. Moody have invented constructed made and applied to use a new & useful improvement for the purpose of cleaning threshing & polishing of Rice, Barley, Broom corn & other small seeds having a hard kernel and which are difficult of separation from the hull or husk called by them Strong & Moody's improved Patent Huller, Smutter & polisher specified in the words following to wit; This improvement consists in a firm quadrangular frame of any required dimensions. In this frame is to be placed a perpendicular shaft moving in a horizontal direction. On the shaft is to be fixed a truncated cone of any required dimensions the circumference or exterior surface of which is to be studded clothed or charged with strong card teeth pins or points of metallic wire set in leather or any other firm & elastic substance. Surrounding this truncated cone so studded charged & clothed & exactly corresponding with its exterior surface is to be placed a hollow cylinder the interior surface of which is to be clothed studded or charged in the same manner &
with the same materials as the truncated cone above
mentioned. Beneath the truncated cone and cylin-
der aforesaid are to be placed a winnower & screen.
on the same or another upright shaft is to be affixed
another truncated cone similar to the one first herein
mentioned & having a corresponding hollow cylinder.
The exterior surface of the cone and the interior surface
of the cylinder last mentioned are to be studded cloth-
ed & charged with very firm and stiff bristles or hair;
or with the skin of the dog fish having an underlay of
caoutchouc or other elastic substance. Beneath this last
mentioned cone & cylinder are to be placed a winnower
& screen & beneath them a bolt covered with screen wire.
Method of operation. The seeds to be cleaned, hulled
or polished are first to be passed thro' a pair of common
mill stones or similar stones having the upper stone
hung on a stiff horn & raised so high as only to
crack & partially separate the outer coat or husk of the
seeds. After winnowing the seed as it comes from
the mill stones it is to be passed by a hopper between
the truncated cone & its corresponding hollow cylinder
which are studded with card teeth pins or points of
metallic wire. when the seed will be entirely divest-
ed of the hull or husk & are then to be passed thro' the win-
nower & screen beneath. If a more perfect polish is
required the seeds are then to be passed thro' the second
cone & its corresponding cylinder from which they are
passed into the winnower & screen beneath & from the
screen into the bolt covered with screen wire. The said
Mordy and Strong claim as their joint invention in the
improvement herein specified & described the method of
hulling cleaning & polishing or burnishing of rice
[illegible]

7295x Nov. 17, 1832 77

Barley Broom corn and other small grains having a hard kernel difficult to separate from the hull or husk by means of truncated cones revolving on a perpendicular shaft in a hollow cylinder & clothed with card teeth pins or [illegible] points of metallic wire set in leather or any other strong & elastic substance, & also for truncated cones revolving on a perpendicular shaft & in a hollow cylinder having the cones & cylinders clothed charged or studded with stiff bristles or hair or with elastic gum or india rubber, as an under lay over which are placed a coating of the skin of the dog fish as polishers or burnishers, as herein specified & described & their claim on this invention is as an improvement on "Strong and Moody's huller smutter & polisher" secured to the present applicants by letters patent from the U States dated Aug.t 29th 1832. In testimony that the above is a true specification of our said improvement as above described we have hereto set our hands the 24th day of September in the year of our Lord 1832

Witnesses
Benjamin Eastman
Peter Woodard

Theodore H. Strong
Marcus T. Moody

[illegible]

Drawing with Hulling Machine